United States Patent [19]

Matsubara

[11] Patent Number: 5,394,514
[45] Date of Patent: Feb. 28, 1995

[54] IMAGE FORMING APPARATUS HAVING DETACHABLY INSTALLED BIT IMAGE FORMING UNIT

[75] Inventor: Toshio Matsubara, Tokyo, Japan

[73] Assignee: Kabushiki Kaisha Toshiba, Kawasaki, Japan

[21] Appl. No.: 87,896

[22] Filed: Jul. 9, 1993

Related U.S. Application Data

[63] Continuation of Ser. No. 710,372, May 29, 1991.

[30] Foreign Application Priority Data

May 31, 1990 [JP] Japan .................. 2-139581

[51] Int. Cl.[6] ........................................... G06F 15/00
[52] U.S. Cl. .................. 395/115; 395/110
[58] Field of Search ........... 395/110, 115, 116, 163, 395/112, 164, 500, 101; 358/404, 444; 400/67, 61, 62, 76

[56] References Cited

U.S. PATENT DOCUMENTS

| | | | |
|---|---|---|---|
| 4,441,164 | 4/1984 | Pavan et al. ................. | 395/115 |
| 4,730,947 | 3/1988 | Ikeda et al. ................. | 400/76 |
| 4,901,249 | 2/1990 | Shiota ........................ | 395/110 |
| 5,051,925 | 9/1991 | Kadono et al. .............. | 395/110 |

FOREIGN PATENT DOCUMENTS

| | | | |
|---|---|---|---|
| 0317996 | 5/1989 | European Pat. Off. . | |
| 3912595A1 | 4/1988 | Germany ..................... | 395/110 |
| 2217492 | 10/1989 | United Kingdom . | |

*Primary Examiner*—Arthur G. Evans
*Attorney, Agent, or Firm*—Foley & Lardner

[57] ABSTRACT

A data processing apparatus having an interface means for fetching a signal from an external device outside the processing apparatus, a CPU connected to the interface means, a data bus, connected to the interface means and the CPU, for exchanging data therebetween, a ROM, connected to the data bus, for storing a character code, and a RAM, connected to the data bus, for storing and reading out the character code, is characterized in that bit image data corresponding to the character code is developed and stored in the RAM by means of the CPU, the data bus, the ROM, and the RAM, and is output to an external device.

8 Claims, 8 Drawing Sheets

OUTLINE

FIG. 6

BIT IMAGE DATA | 1 BITE | L

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 1 | 0 | 0 | 0 | 0 | 0 | 0 | 0 |
| 0 | 0 | 0 | 0 | 0 | 1 | 1 | 1 | 0 | 0 | 0 | 0 | 0 | 0 |
| 0 | 0 | 0 | 0 | 0 | 1 | 1 | 1 | 0 | 0 | 0 | 0 | 0 | 0 |
| 0 | 0 | 0 | 0 | 0 | 1 | 1 | 1 | 0 | 0 | 0 | 0 | 0 | 0 |
| 0 | 0 | 0 | 0 | 1 | 1 | 1 | 1 | 1 | 0 | 0 | 0 | 0 | 0 |
| 0 | 0 | 0 | 0 | 1 | 1 | 1 | 1 | 1 | 0 | 0 | 0 | 0 | 0 |
| 0 | 0 | 0 | 0 | 1 | 1 | 1 | 1 | 1 | 0 | 0 | 0 | 0 | 0 |
| 0 | 0 | 0 | 0 | 1 | 1 | 1 | 1 | 1 | 1 | 0 | 0 | 0 | 0 |
| 0 | 0 | 0 | 0 | 1 | 1 | 1 | 1 | 1 | 1 | 0 | 0 | 0 | 0 |

IMAGE FORMING APPARATUS HAVING DETACHABLY INSTALLED BIT IMAGE FORMING UNIT

This application is a continuation of application Ser. No. 07/710,372, filed May 29, 1991.

BACKGROUND OF THE INVENTION

1. Field of the Invention

The present invention relates to a data processing apparatus for, e.g., a laser printer or the like, which receives image data from an external apparatus and prints a recording image on a paper sheet in accordance with the received data.

2. Description of the Related Art

Conventionally, image formation of a data processing apparatus for, e.g., a laser printer or the like, is performed by the steps of charging, exposure, development, transfer, separation, cleaning, fixing, and the like. In a data processing apparatus of this type, a charger, an exposure unit, a developing unit, a transfer unit, a separation unit, a cleaning unit, and the like are sequentially arranged around a photosensitive drum. A fixing unit is also provided for receiving a paper sheet from the separation unit. These units are driven in accordance with the rotational movement of the photosensitive drum to execute the respective image forming steps, thereby forming an image on a paper sheet.

In a laser printer of this type, two separate control systems are provided for an engine control circuit for controlling the respective units to execute the respective image forming steps, and a printer control circuit for controlling the operation of the engine control circuit. The engine control circuit and the printer control circuit are interfaced by exchange of commands and status signals. The printer control circuit receives image data in units of pages, which is supplied from an external apparatus, forms by developing bit image data (bit map data) from the image data, and outputs the bit image data to the engine control circuit.

In the laser printer of this type, an IC card or a memory cartridge which has a memory unit storing character patterns is mounted. The image data in units of pages which is supplied from an external apparatus is developed to bit image data (bit map data) by using the character patterns stored in the IC card or the memory cartridge.

When a large number of character types are to be printed, however, an IC card or a memory cartridge that stores a large number of character types must be prepared, or, a data processing function such as a deriving function must be incorporated in the laser printer.

As a result, when a large number of character types are to be printed, a memory unit having a large memory capacity is required for an IC card or a memory cartridge, or the printing speed is decreased due to the data processing function.

SUMMARY OF THE INVENTION

It is an object of the present invention to provide a data processing apparatus which can print a large number of character types without a memory unit having a large memory capacity and without decreasing the processing speed.

According to the present invention, there is provided a data processing apparatus having an interface means (92) for fetching a signal from an external device outside the processing apparatus; a CPU (11) connected to the interface means (92); a data bus (114), connected to the interface means (92) and the CPU (111), for exchanging data therebetween; a ROM (112), connected to the data bus (114), for storing a character code; and a RAM (113), connected to the data bus (114), for storing and reading out the character code, characterized in that bit image data corresponding to the character code is developed and stored in the RAM (113) by means of the CPU (11), the data bus (114), the ROM (112), and the RAM (113), and is output to an external device.

According to the present invention, a data processing apparatus having the interface means (92), the CPU (111), the data bus (114), the ROM (112), and the RAM (113) is mounted on a laser printer or the like which processes external character codes, and the data processing apparatus is operated. As a result, bit image data of a large number of character codes exceeding the memory capacity of the internal memory unit of the laser printer or the like can be adopted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, explain the principles of the invention.

DETAILED DESCRIPTION OF THE PREFERRED EMBODIMENTS

The preferred embodiments of the present invention will be described with reference to the accompanying drawings.

Figure 2:
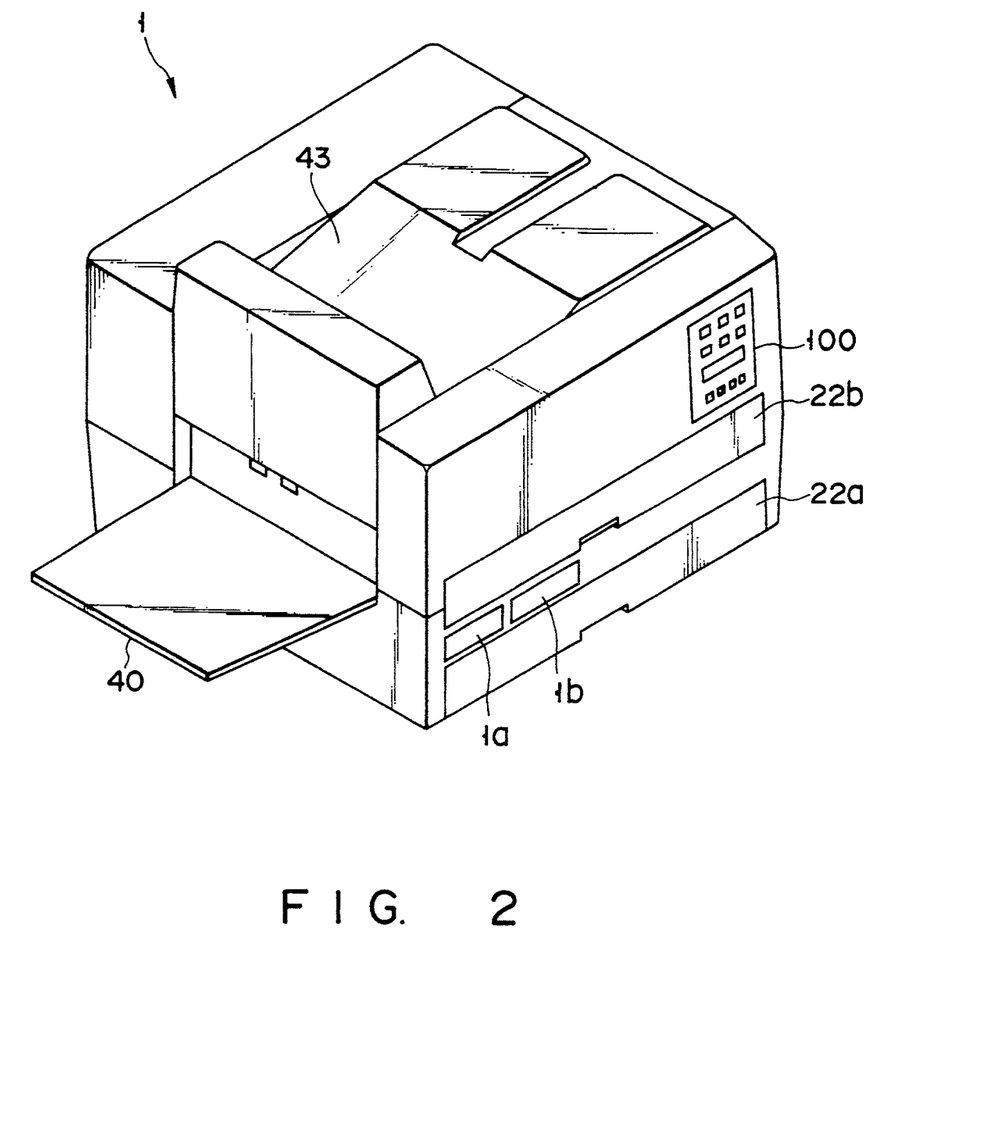
FIG. 2 is a perspective view of the outer appearance of a laser printer.
Figure 3:
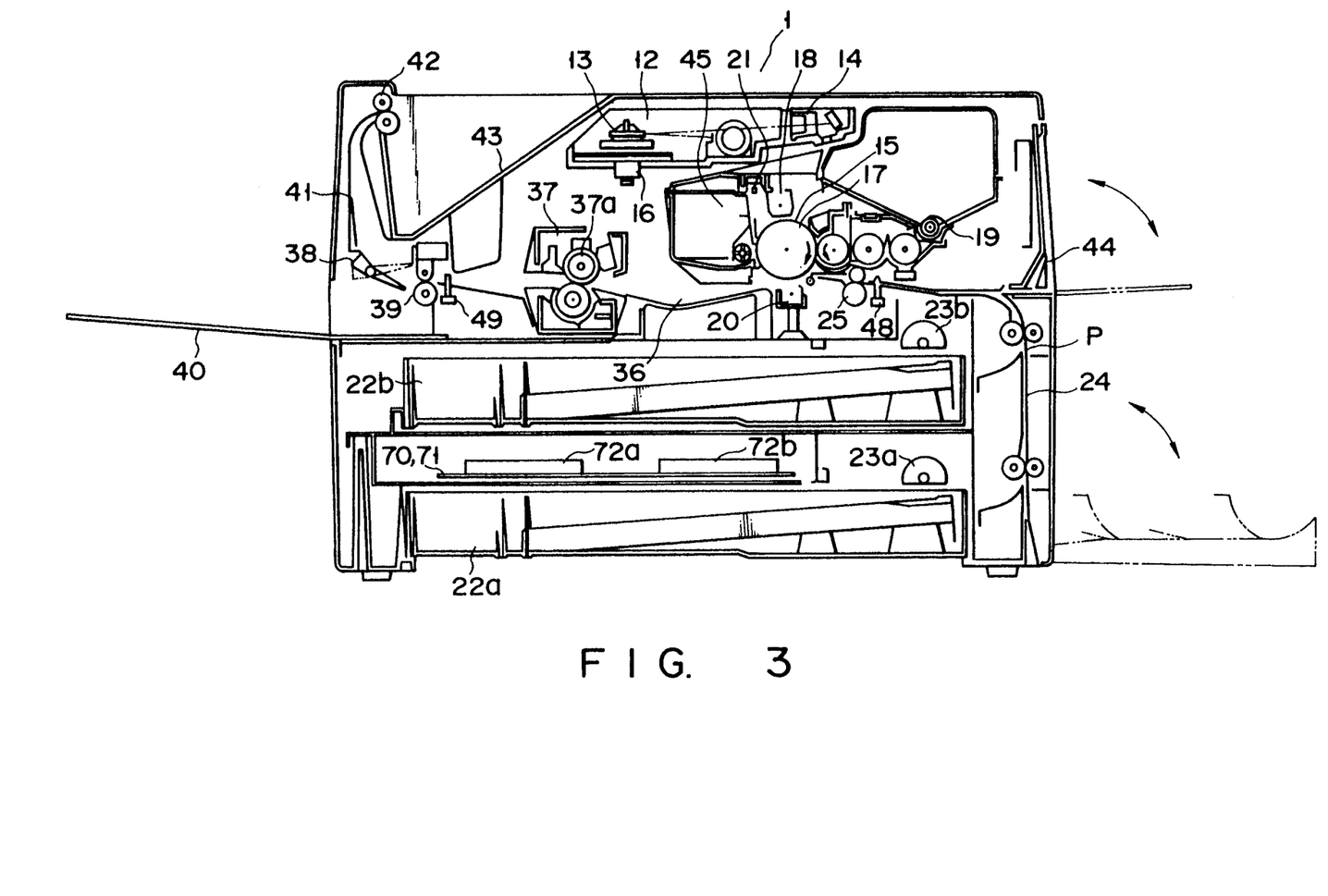
FIGS. 3 and 4 are schematic views of the internal structure of the laser printer.

FIGS. 2 and 3 show the arrangement of a data processing apparatus according to the present invention, e.g., an image forming unit apparatus as a laser printer.

A process system comprising a laser optical system 12, a photosensitive drum 17, a charger 18 comprising a SCOROTRON, a developing unit 19, a transfer unit 20 comprising a SCOROTRON, a pre-exposure unit 21 as a discharger, a fixing unit 37, a cleaning unit 45, and the like are arranged in a laser printer 1. Paper cassettes 22a and 22b, feed rollers 23a and 23b, an aligning roller pair 25, a convey guide 36, a gate 38, paper discharge roller pairs 39 and 42, and the like are also arranged in the laser printer 1. The laser optical system 12 is constituted by a semiconductor laser oscillator (not shown), a collimator lens (not shown), a polygonal mirror (rotating mirror) 13, an f.θ lens 14, a mirror 15, a mirror motor 16 for rotating (driving) the polygonal mirror 13, and the like. The semiconductor oscillator oscillates a laser beam. The collimator lens collimates the laser beam from the oscillator to a parallel beam. The polygonal mirror 13 is a rotating member having a polygonal mirror for reflecting the laser beam from the collimator lens in units of scanning lines.

In the image forming operation, a laser beam, supplied from the laser optical system 12 and corresponding to an image signal from an external apparatus (not shown) or an operation panel (to be described later) 100, forms an image on the surface of the photosensitive drum 17. The photosensitive drum 17 is rotated in a direction indicated by an arrow in the drawing. The surface of the drum 17 is charged first by the charger 18, and then exposure corresponding to the image signal is performed by the laser optical system. More specifically, the laser beam generated by the laser oscillator scans the photosensitive drum 17 at a constant speed from the left to the right as the polygonal mirror 13 is rotated by the mirror motor 16, so that an electrostatic latent image is formed on the surface of the drum 17. A toner is fixed to the electrostatic image by the developing unit 19, thus visualizing the image.

Paper sheets P in the paper cassette 22a or 22b, as a medium on which an image is to be formed, are picked up by the feed roller 23a or 23b one at a time, and each sheet is guided to the aligning roller pair 25 along a paper guide route 24, and is supplied to the transfer section by the roller pair 25.

A paper sheet P supplied from a manual feed section 44 and guided to the aligning roller pair 25 is conveyed to the transfer section in accordance with a designation made by the external apparatus or the operation panel 100 (described later).

The paper sheet P conveyed to the transfer section is brought into tight contact with the surface of the photosensitive drum 17 at a place where the transfer unit 20 is located, and a toner image on the drum 17 is transferred by the operation of the transfer unit 20. The image-transferred paper sheet P is separated from the photosensitive drum 17 and is conveyed to the fixing unit 37 through the convey guide 36. As the paper sheet P passes through the fixing unit 37, the transfer image is thermally fixed by a heat roller 37a that generates fixing heat. A heater lamp (not shown) is stored in the heat roller 37a. After image fixing, the paper sheet P is conveyed onto a paper discharge tray 40 by the paper discharge roller pair 39 through a gate, or onto an upper convey route 41 through the gate 38 and discharged onto a paper discharge tray 43 by the paper discharge roller pair 42.

After image transfer, the toner remaining on the photosensitive drum 17 is removed by the cleaning unit 45, and the after image is deleted by the pre-exposure unit 21. Then, the next image formation becomes possible.

Figure 4:
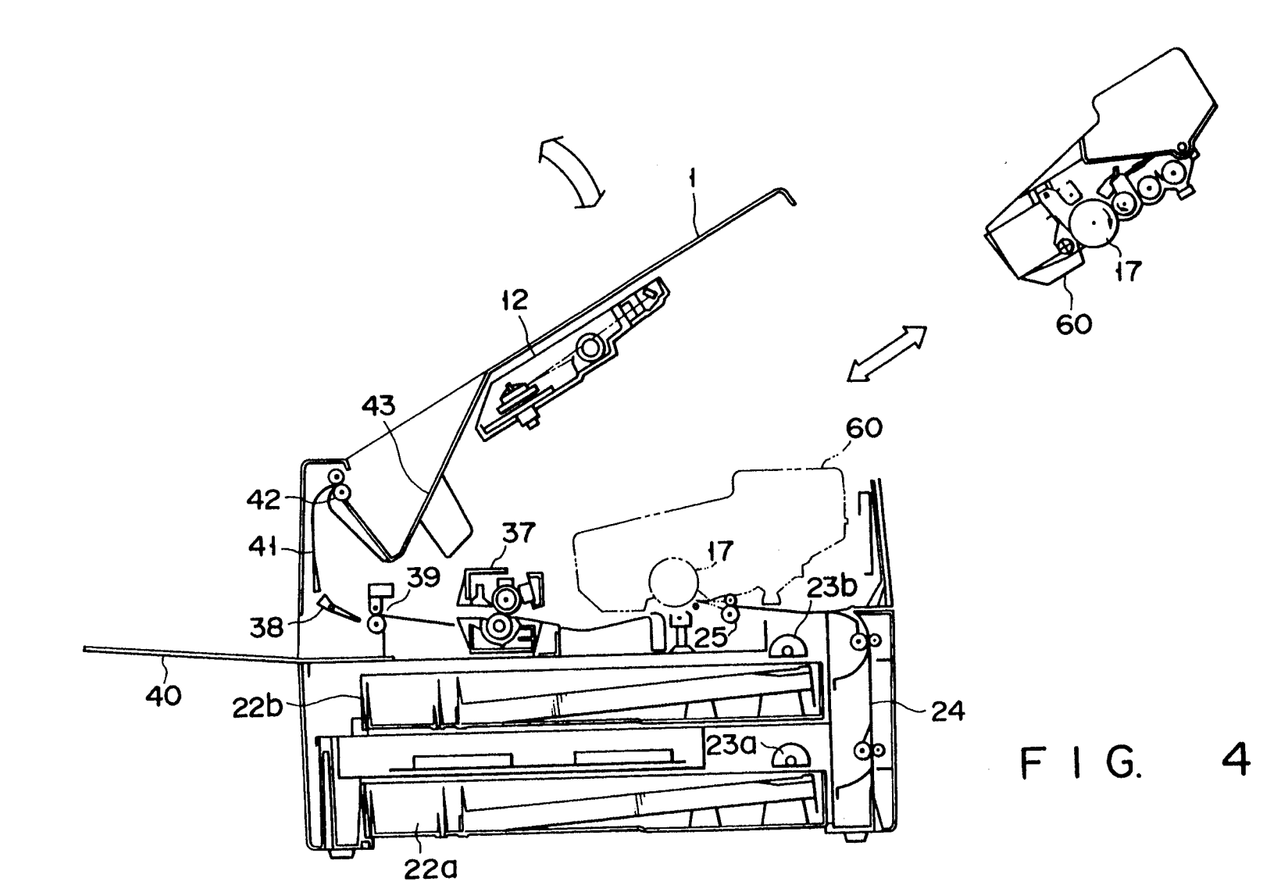

The photosensitive drum 17, the charger 18, the developing unit 19, the pre-exposure unit 21, the fixing unit 37, and the cleaning unit 45 are integrally assembled as a unit and are mounted as an electrophotographic process unit 60 to be independently detachable from the printer main body 1, as shown in FIG. 4.

An aligning switch 48 is provided before the aligning roller pair 25 for detecting a paper feed error to the transfer section caused by the aligning roller pair 25 or the like. A paper discharge switch 49 is provided before the paper discharge roller pair 39 for detecting a paper discharge error caused by the paper discharge roller pair 39.

An engine control board and a printer control board are arranged between the paper cassettes 22a and 22b. The engine control board is loaded with an engine control circuit 70 for controlling the respective electric units provided in the apparatus main body 1, thereby controlling the sequence for completing the electrophotographic process. The printer control board is loaded with a printer control circuit 71 for controlling the operation of the engine control circuit 70.

A maximum of three boards can be mounted for the printer control circuit 71 in accordance with the degree of the function (e.g., to increase the types of faces or Chinese characters). Two IC card connectors 72a are arranged at the front end of the board for the printer control circuit 71 located lowermost. When an additional function IC card 95 (described later) is inserted in the two IC card connectors 72a, a function can be further added. A connector (not shown) for interface with a host apparatus 89 (described later) as an external output apparatus, e.g., a computer and a word processor, is provided on the left-end face of the board for the printer control circuit 71 located lowermost.

The operation panel 100 for designating various types of operations is provided on the upper surface of the laser printer 1.

The arrangement of the printer control circuit 71 will be described.

Figure 1:
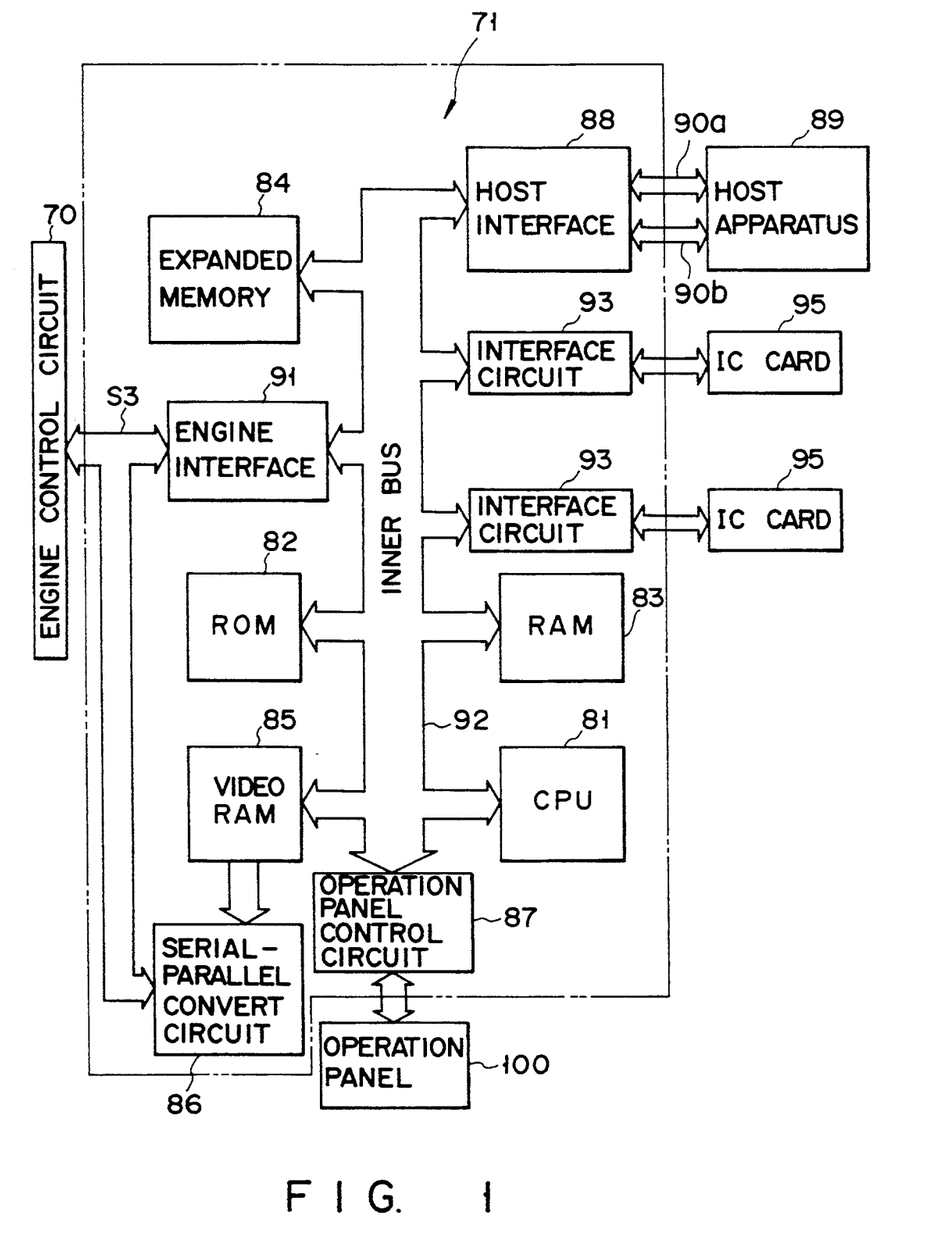
FIG. 1 is a block diagram showing the arrangement of the main part of a printer control circuit.

FIG. 1 is a block diagram showing the arrangement of the main part of the printer control circuit 71. In FIG. 1, a CPU 81 performs overall control of the printer control circuit 71. The CPU 81 obtains bit map data corresponding to character data as the image data sent from the host apparatus 89 and stores the obtained bit map data in a video RAM 85. A ROM 82 stores a control program. The CPU 81 is operated in accordance with the control program. The ROM 82 stores a password collated upon data updating, data regarding the paper sheet P, e.g., top margin, left margin, and paper type, message data to be informed to the operator, and the like. A RAM 83 is used as a page buffer for temporarily storing image data sent from the host apparatus 89. An expanded memory 84 has a large capacity and is used when image data sent from the host apparatus 89 is a large quantity of data, e.g., bit map data and when 1-page data cannot be stored in the RAM 83. The video RAM 85 stores image data developed in the form of a bit image, i.e., the bit map data supplied from the IC card 95. An output from the video RAM 85 is supplied to a serial-parallel convert circuit 86. The serial-parallel convert circuit 86 converts image data, which is sent as parallel data developed in the form of the bit image (bit map data) from the video RAM 85, and outputs the converted serial data to the engine control circuit 70.

A host interface 88 performs data exchange between the host apparatus 89, comprising, e.g., a computer or an image reader, and the printer control circuit 71. The host interface 88 has a serial transfer line 90a and a parallel transfer line 90b. The serial and parallel transfer lines 90a and 90b are switched as needed in accordance with the type of data exchanged between the host apparatus 89 and the printer control circuit 71. An engine interface 91 serves to exchange an interface signal S3 between the printer control circuit 71 and the engine control circuit 70. Interface circuits 93 are used to connect/disconnect a power source and a signal line. When an IC card 95 is inserted in the connector 1a or 1b, or is pulled out from the connector 1a or 1b, the corresponding interface circuit 93 connects/disconnects the power source and the signal line so that data stored in the IC card 95 may not be undesirably damaged by noise occurred upon card inserting/pulling movement.

An operation panel control circuit 87 controls the display of a guide message on a liquid crystal display (not shown) of the operation panel 100, control to turn on/off or flicker an LED display (not shown), and control to send data, input from the operation panel 100, to the CPU 81. An inner bus 92 serves to exchange data among the CPU 81, the ROM 82, the RAM 83, the expanded memory 84, the video RAM 85, the operation panel control circuit 87, the host interface 88, the engine interface 91, and the interface circuit 93.

Figure 5:
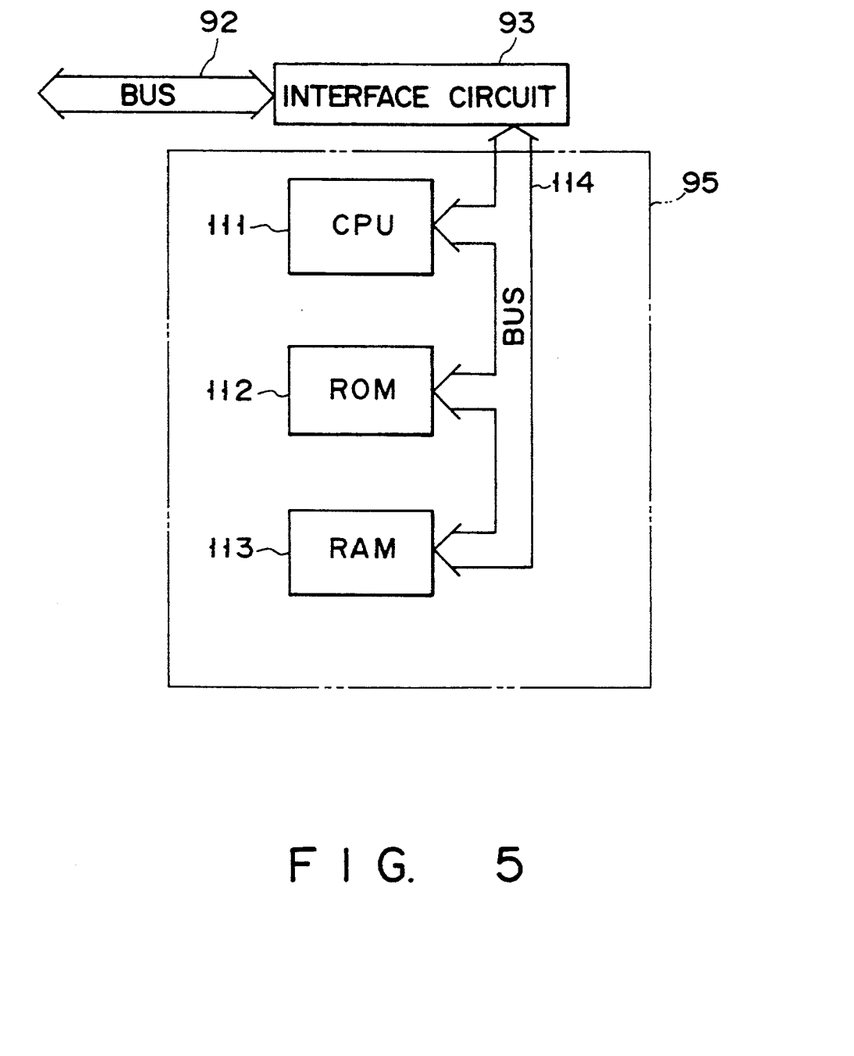
FIG. 5 is a block diagram showing the arrangement of an IC card.

The IC card 95 is used to form bit map data upon a character request from the printer control circuit 71 and to send back the formed data to the printer control circuit 71. As shown in FIG. 5, the IC card 95 comprises a CPU 111, a mask ROM 112, a static RAM 113, and a bus 114. The CPU 111 performs overall control of the IC card 95. The mask ROM 112 has outline font data as a basic font, and a control program for controlling the CPU 111. The static RAM 113 is a non-volatile memory for temporarily storing data and is of a battery backup type. The bus 114 serves to exchange data among the CPU 111, the ROM 112, the RAM 113, and the interface circuits 93.

The CPU 111 forms bit map font data by processing outline font data. Upon formation of the bit map data, a character having an arbitrary resolution, an arbitrary size, and an arbitrary direction can be formed. Furthermore, the character attributes can be arbitrarily changed, e.g., the width of a line constituting a character can be converted, a character style can be changed, e.g. to italics or only an edge line need be drawn. The RAM 113 is divided into a work area 113a for operation by the CPU 111 and a cache area 113b for storing font data converted into bit map data. The font data stored in the cache area 113b is already converted into bit map data. Therefore, when the same characters are requested by the print control circuit 71, data transfer is performed without data exchange from outline data to bit map data.

The bit map data formed in the work area 113a is transferred to the cache area 113b directly or in an compressed form, and is registered as a character in the cache area 113b. When the bit map data is compressed and registered in the cache area 113b, it should be expanded before it is transferred to the printer control circuit 71. With this arrangement, bit map data corresponding to a larger number of characters can be registered when compressed data is expanded to form bit map data, the necessary processing can be done within a shorter period of time than that of processing for forming bit map data from outline data.

The RAM 113 can comprise an E₂PROM or an EPROM in place of a non-volatile memory.

Figure 6:
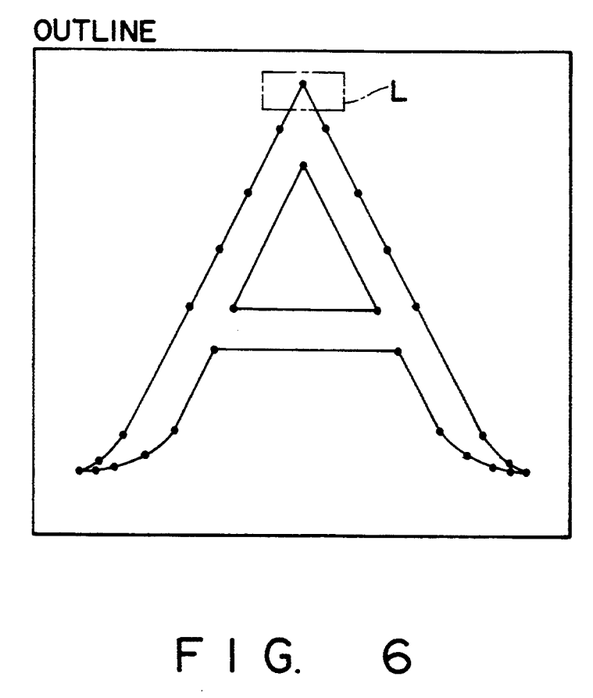
FIG. 6 is a view for explaining outline data.
Figure 7:
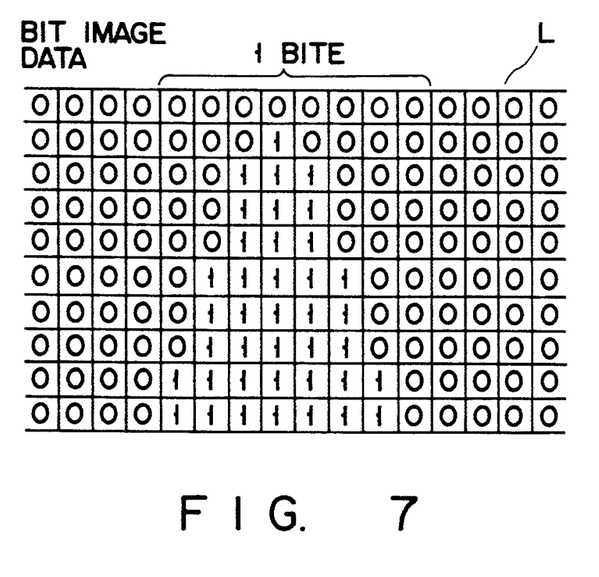
FIG. 7 is a table for explaining bit map data.

The outline data stored in the RAM 113 comprises font data indicating the edge of a character. For example, in case of a character "A" as shown in FIG. 6, position data of respective points of the character and associated characteristic (line, circle, diameter) data are stored in the RAM 113. The CPU 111 forms the bit map data, as shown in FIG. 7, by using these point position data and the characteristic data.

Figure 8A:
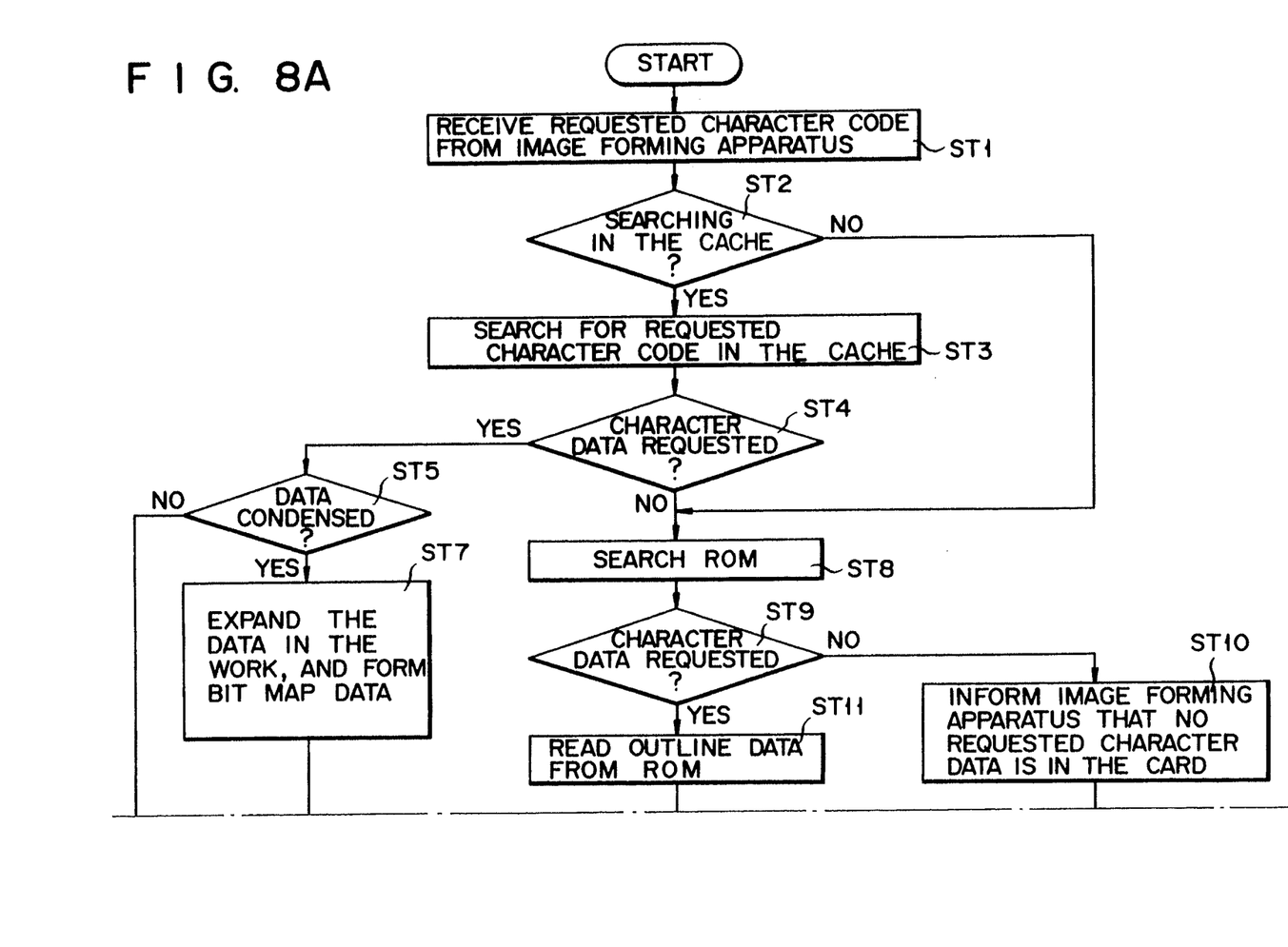
FIGS. 8A and 8B show a flow chart showing the operation of the IC card.
Figure 8B:
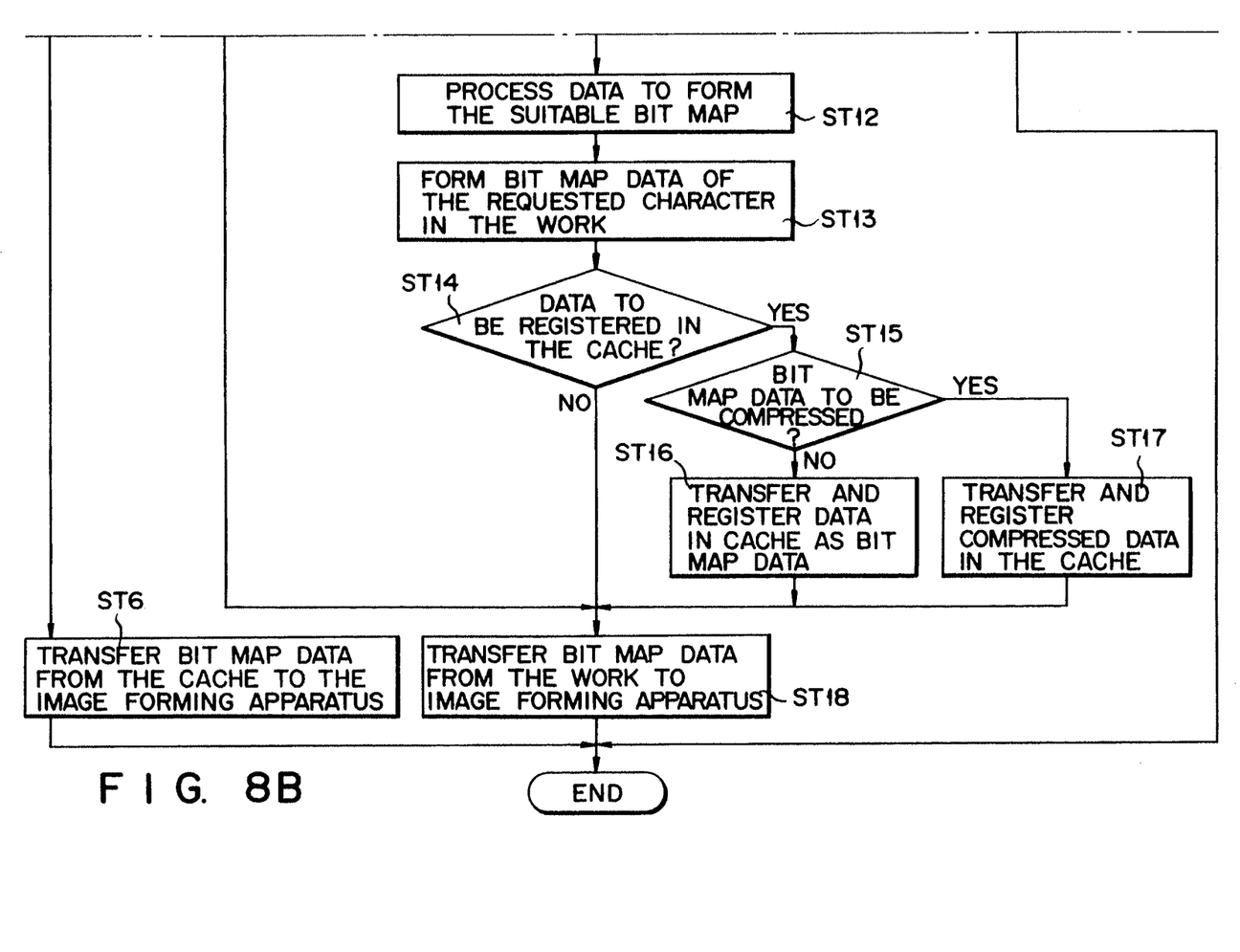

The operation of the laser printer having the above arrangement will be described with reference to the flow chart of FIGS. 8A and 8B that shows the operation of the IC card.

Assume that image data from the host apparatus 89 is stored in the page buffer of the RAM 83 through the host interface 88 and the inner bus 92. Then, the CPU 81 outputs a character code request corresponding to the supplied image data to the IC card 95 through the inner bus 92 and the interface circuit 93. The IC card 95 forms bit map data corresponding to the character code requested by the CPU 81, and sends back the formed data to the CPU 81.

More specifically, when a character code is requested by the CPU 81, it is supplied to the CPU 111 from the interface circuit 93 through the bus 114 (step ST1). The CPU 111 checks whether or not data corresponding to the requested character code is present in the cache area 113b (steps ST2 and ST3). If YES (step ST4), the CPU 111 checks whether or not the corresponding data is compressed (step ST5). As a result, if NO, the CPU 111 outputs bit map data in the cache area 113b corresponding to the requested character to the CPU 81 through the bus 14, the interface circuit 93, and the inner bus 92 (step ST6). If YES, the CPU 111 expands data in the cache area 113b corresponding to the requested character and forms bit map data in the work area 113a (step ST7). Subsequently, the CPU 111 outputs the expanded bit map data in the work area 113a to the CPU 81 through the bus 114, the interface circuit 93, and the inner bus 92 (step ST8).

If data corresponding to the requested character code is not present in the cache area 113b, the CPU 111 checks whether or not data corresponding to the requested character code is present in the ROM 112 (step ST9). If NO, the CPU 111 informs it to the CPU 81 through the bus 114, the interface circuit 93, and the inner bus 92 (step ST10). If YES, the CPU 111 reads out outline data from the ROM 112 (step ST11), processes the read outline data in correspondence with the attributes described above (step ST12), thus forming bit map data in the work area 113a (step ST13).

Then, the CPU 111 checks whether or not the formed bit map data is to be registered in the cache area 113b (step ST14). If YES, it is checked whether or not the data is to be compressed (step ST15). If YES in step ST14 and NO in step ST15, the bit map data formed in the work area 113a is directly registered in the cache area 113b unchanged (step ST16). If YES in step ST14 and YES in step ST15, the bit map data formed in the work area 113a is compressed and registered in the cache area 113b (step ST17). If the formed bit map data is not to be registered in the cache area 113b, or after it is registered in the cache area 113b, the CPU 111 outputs the bit map data, formed in the work area 113a, to the CPU 81 through the bus 114, the interface circuit 93, and the inner bus 92 (step ST18).

The CPU 81 sequentially stores bit map data corresponding to the requested character code and obtained from the IC card 95 in the video RAM 85.

Furthermore, the CPU 81 converts image data (bit map data) of an bit image for a predetermined number of lines, which is stored in the video RAM 85, into serial data by the serial-parallel convert circuit 86 in synchronism with a horizontal sync signal and a video clock, and outputs the serial data to the engine control circuit 70.

Then, the engine control circuit 70 performs a series of printing operations in accordance with the image data (bit map data) of a bit image which is supplied from the printer control circuit 71. When the printing process is completed, the engine control circuit 70 is set in the standby mode.

As described above, the respective character codes of image data, received from the host apparatus, is developed to bit image data on the side of the IC card mounted in the printer. Therefore, a large number of character types can be printed without providing a large-capacity memory unit in the IC card, without adding extra load to processing in the laser printer, and without decreasing a printing speed.

Bit image data having an arbitrary attribute can be formed from outline data stored in the memory element (memory means) in the IC card. Therefore, a memory element having a smaller capacity can be used than that used in a case when the memory element has bit image data in units of attributes.

The present invention exemplifies a case in which an IC card is mounted as an external processing apparatus. However, the present invention is not limited to this, and a cartridge having a memory element and a control element can be used instead.

The present invention exemplifies a laser printer as an image processing apparatus. However, the present invention is not limited to this, and a facsimile or a CRT display can be employed instead. In this case, even when an apparatus not having a function to process outline data is used, an image can be processed by using bit image data corresponding to outline data supplied from an IC card.

As has been described above, according to the present invention, there is provided a data processing apparatus which can print a large number of character types without requiring a large-capacity memory unit and without decreasing a printing speed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:
a main body for performing an image forming operation; and
a unit detachably installed in the main body,
the main body including:
(i) means for receiving data to be formed from a host apparatus;
(ii) printing apparatus for printing on a recording medium bit image data supplied from the unit; and
(iii) first processing means for controlling an operation enabling the receiving means to receive character data and supply the character data to the unit, receiving the bit image data based on the character data from the unit, supplying the bit image data to the printing means, and controlling the printing of the printing means based on the bit image data,
the unit including:
(i) a receiving portion for receiving data from the main body;
(ii) first storing means for storing the character data formed of a plurality of character patterns;
(iii) means connected to said receiving portion of said first storing means for forming the bit image data from the data received by the receiving portion using the character patterns stored by the first storing means,
(iv) second storing means for storing the bit image data formed by said forming means;
(v) means for supplying the bit image data stored by said second storing means to the main body;
(vi) a third storing means for storing the bit image data stored by said second storing means at an operation speed which is higher than that of the second storing means; and
(vi) second processing means for controlling an operation enabling the unit to retrieve the bit image data based on the character data from the first storing means, and supply the bit image data to the first processing means, when the receiving portion receives data from the printing apparatus;
whereas, when bit image data are present in the third storing means, the second processing means enables the supplying means to supply the bit image data stored by the third storing means to the printing apparatus; and
when bit image data is absent from the third storing means, the second processing means enables the forming means to form bit image data from the data received by the receiving portion using the character patterns stored by the first storing means, enabling the second storing means to store the bit image data, enabling the supplying means to supply the bit image data stored by the second storing means to the printing apparatus, and enabling the third storing means to store the bit image data stored by the second storing means.

2. An image forming apparatus comprising:
a main body for forming images on a recording medium; and
an integrated circuit unit detachably installed in said main body;
said main body including:
(1) receiving means for receiving bit image data from said integrated circuit unit; and
(2) image forming means for forming on said recording medium images based on said bit image data; and
said integrated circuit unit including:
(1) receiving means for receiving data from said main body;
(2) first storing means for storing character data, said character data formed from a plurality of stored character patterns;
(3) means responsive to said data received by said receiving means, for forming said bit image data;
(4) second storing means for storing said bit image data from said forming means;
(5) third storing means for storing and retrieving said bit image data at a speed greater than that of said second storing means; and
(6) supplying means for supplying said bit image data to said main body from one of said second and said third storing means;
wherein, when said bit image data is stored in said third storing means, said supplying means supplies bit image data stored in said third storing means to said main body; and when said third storing means is not storing said bit image data, said supplying means supplies said bit image data stored in said second storing means to said main body.

3. The image forming apparatus of claim 2, wherein, said first storing means comprises a ROM.

4. The image forming apparatus of claim 2, wherein said second storing means comprises the work area of a RAM.

5. The image forming apparatus of claim 13, wherein, said third storing means comprises a cache memory of said RAM.

6. A data processing apparatus according to claim 1, wherein said forming means includes forming portions for forming the bit image data and a storing portion for storing the formed bit image data.

7. A data processing apparatus according to claim 1, wherein the unit has means for compressing the bit image data formed by the forming means.

8. A data processing apparatus according to claim 7, wherein the unit has memory means for storing the compressed bit image data to the storing portion and means for transferring the compressed bit image data stored in the storing portion to the image forming apparatus.

* * * * *